Aug. 2, 1932.　　　　L. BENOIT　　　　1,869,457
APPARATUS FOR HANDLING EGGS
Filed June 29, 1928　　　2 Sheets-Sheet 2
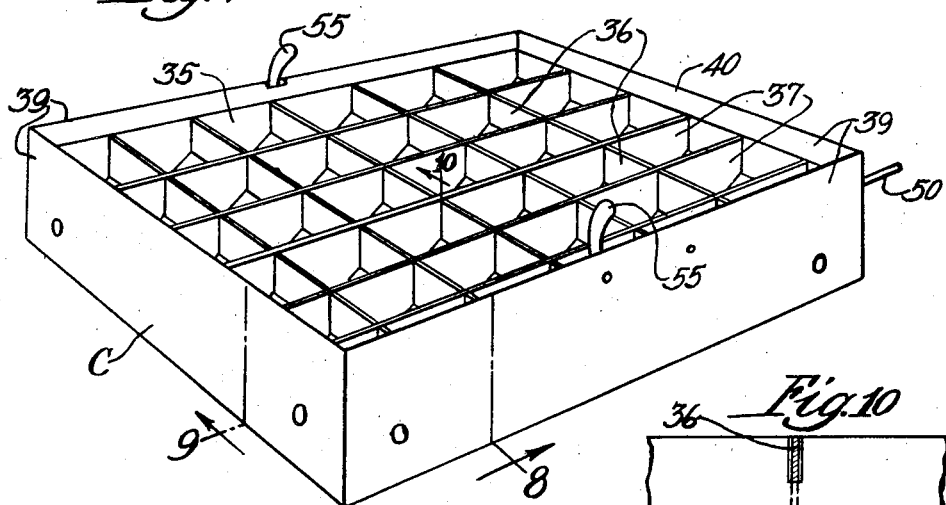
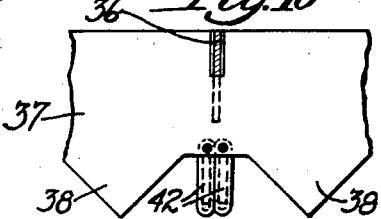
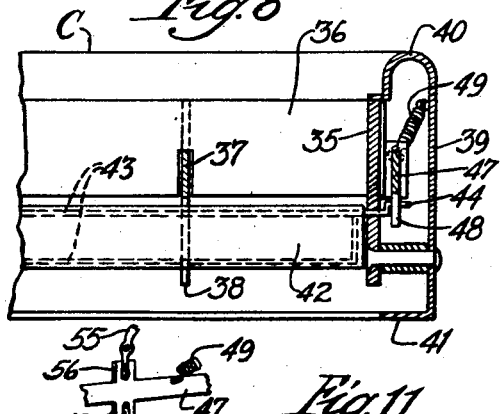
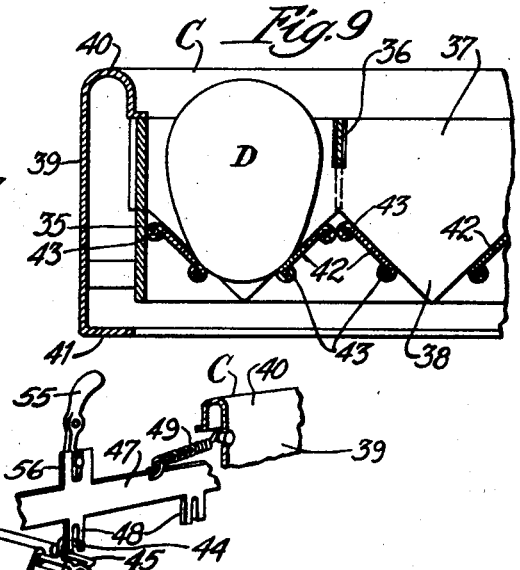
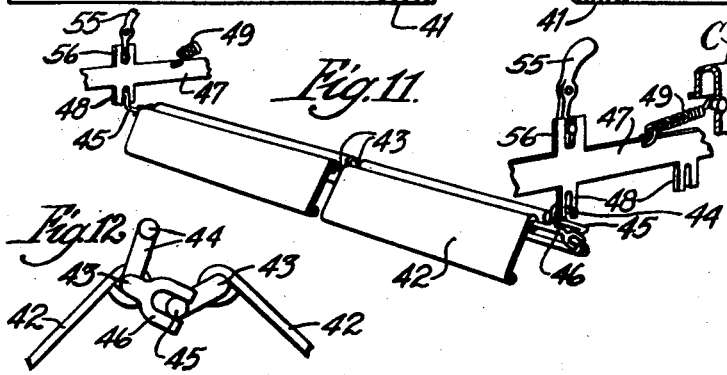
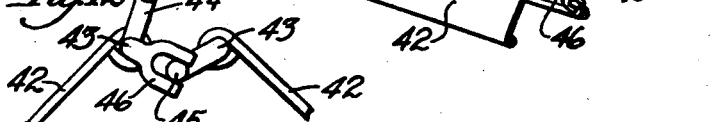

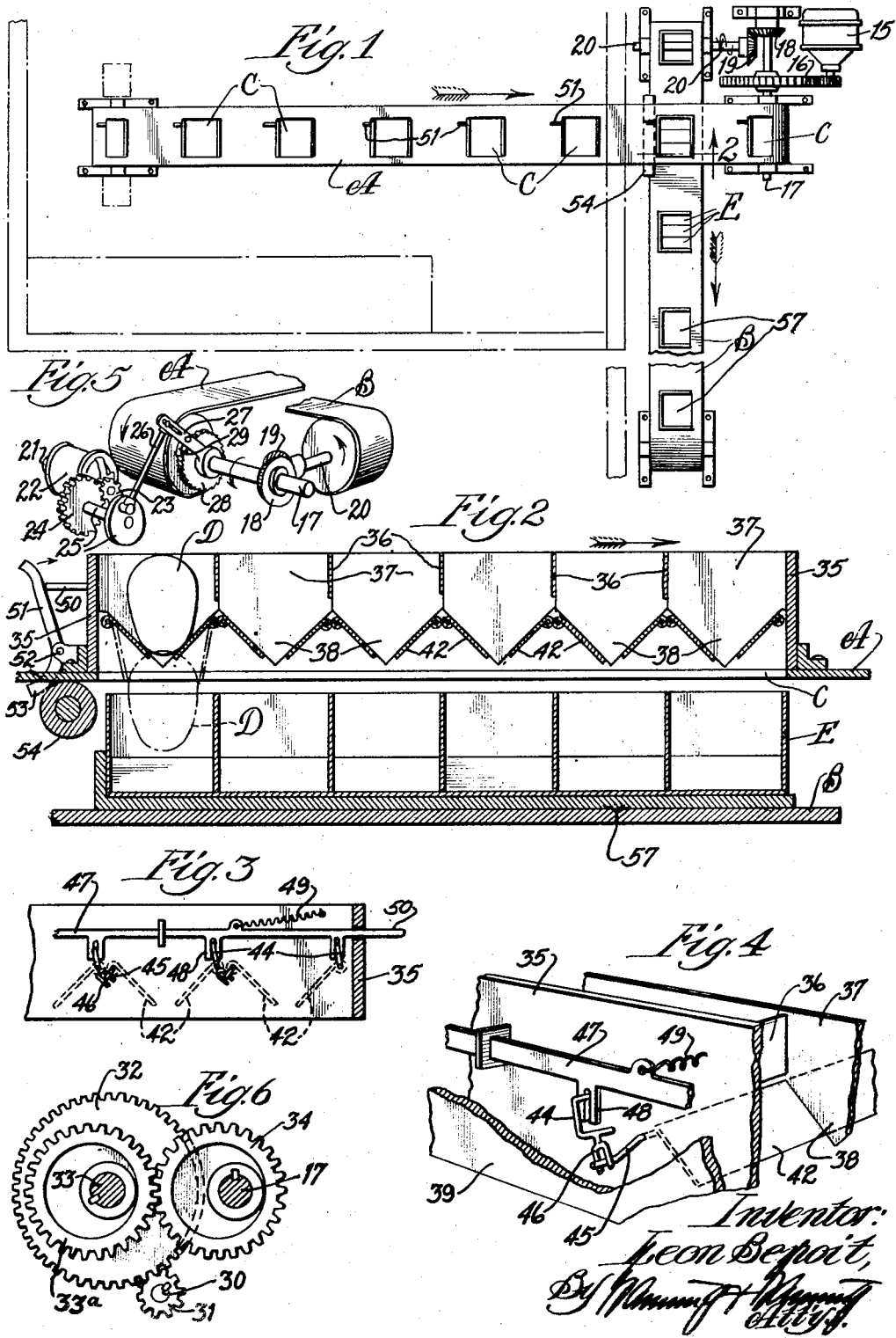

Patented Aug. 2, 1932

1,869,457

UNITED STATES PATENT OFFICE

LEON BENOIT, OF CHICAGO, ILLINOIS

APPARATUS FOR HANDLING EGGS

Application filed June 29, 1928. Serial No. 289,176.

This invention which relates generally to the handling of eggs and like commodities, is concerned particularly with an apparatus by which eggs are cartoned directly after being candled, graded, or otherwise treated, the object being to save time, labor, and expense incident to the several operations of packing and unpacking, which are usually performed by hand. My invention is concerned also with the novel steps by which this cartoning of the eggs is automatically attended to. In brief, it consists in a mechanical conveyance of the eggs from a receiving point, such as the candling, grading, washing or treating room, to a delivery point where cartons await filling, and in automatically transferring the eggs into the cartons, this operation being continuously performed either with or without pauses, as preferred. The invention may be best understood by reference to the accompanying drawings wherein is illustrated a suggestive embodiment thereof in the manner following:

Figure 1 is a view in plan of the conveyor mechanism in its entirety;

Fig. 2 is an enlarged detail in section taken on line 2 of Fig. 1;

Fig. 3 is a detail in elevation of the operating means for the tray hoppers;

Fig. 4 is a perspective view of the same parts;

Fig. 5 is a detail in perspective of a suggestive transmission by which an intermittent movement is imparted to the conveyor mechanism;

Fig. 6 is a similar view of a transmission designed to impart to the conveyor mechanism an irregular movement with pauses at even intervals;

Fig. 7 is a perspective view of an egg receiving tray having a hopper bottom for the automatic discharge of eggs therefrom into a carton or other receptacle;

Figs. 8, 9, 10 are details in section taken respectively on lines 8, 9, and 10 of Fig. 7;

Fig. 11 is a detail in perspective of a hopper release mechanism which may be used with the tray shown in Fig. 7; and Fig. 12 is a detail in perspective of one part of the release mechanism shown in Fig. 11.

Referring to Figure 1 in particular, I have illustrated an endless conveyor unit A arranged to cross over a second endless conveyor unit B, the directions in which these conveyor units move being indicated by the associated arrows. The movements of these conveyor units are synchronized in such a way as to ensure proper cooperation in the manner hereinafter set forth. For operating the two conveyors a common transmission may be employed, three suggestive forms being shown in Figs. 1, 5 and 6.

The mechanism of Fig. 1 includes a motor 15 in driving connection with a gear 16 having a fast mounting on the shaft 17 whereon is carried the wheels (not shown) over which the conveyor unit A is trained. As by means of bevel gear connections 18 and 19 the shaft 17 is drivingly connected with a shaft 20 whereon is carried the wheels over which the conveyor unit B is run. With such a transmission both conveyor units are operated in synchronism, continuously and at an even speed. An intermittent operation is obtained by the transmission of Fig. 5 wherein I have shown a driving shaft 21 receiving power from a belt which trains over a pulley 22 thereon (or otherwise, if desired) and carrying a pinion 23 in mesh with gear 24 which operates a crank 25 from which extends a pitman 26 having a radially adjustable connection with an arm 27, one end whereof is loosely mounted on the shaft 17 of the conveyor unit A (or shaft 20 of conveyor B). Carried fast on this same shaft is a ratchet wheel 28 receiving engagement from a pawl 29 which is pivotally supported on the arm 27. In this construction the rotary movements of the crank 25 are transformed into reciprocations and then into oscillations through the respective mediums of the pitman 26 and arm 27, and by reason of the ratchet driving connection between the latter and the shaft 17 the conveyor unit A derives a movement which is intermittent. A connection through bevel gears 18 and 19 transmits to the conveyor unit B a like movement. For imparting an irregular movement to the conveyor mechanism, a transmission such as is shown in Fig. 6 may be employed. This includes a driving shaft 30 whereon is mounted a pinion 31 meshing with a gear 32 carried fast on a shaft 33. Eccentrically mounted on this last shaft is a second gear 33ª in mesh with a gear 34 having a like eccentric mounting on the shaft 17 of the conveyor unit A (or shaft 20 of conveyor B). By the connections described a uniform speed rotation of the driving shaft is so transformed that the driven shaft is operated with a variable rotation having regular pauses.

Let it be considered that the starting point or receiving end of the conveyor unit A (the left end thereof as shown in Fig. 1) is located in the room where candling, grading, washing, or other treatments are applied to eggs, and that the finishing or delivery point is remote therefrom, presumably in a second room traversed by the conveyor unit B. There remains still the problem of moving the eggs from one of these points to the other, and of doing this in the most expeditious and economical manner possible. By the means now to be described, I provide not only for such a movement of the eggs with the aid of the conveyor mechanism hereinbefore explained, but also for the automatic cartoning of the eggs as and when they arrive at the delivery point of the conveyor unit A.

Referring to Figs. 7, 8, and 9, a square tray C is here illustrated having four inner sides 35 which enclose a cellular structure consisting of two series of evenly spaced intersecting walls 36 and 37. As shown, five of such walls are included in each series which, together with the tray sides, form a total of three dozen cells or compartments each adapted for the reception of a single egg. The tray parts may be produced from sheet metal and fashioned securely into a rigid structure so as to withstand repeated handling over a long period of time. The walls 36 of one series may have both the upper and lower edges thereof trimmed straight, while the lower edges of the remaining walls 37 are, by preference, extended downwardly in a series of points 38 one in alignment with each cell row of the trays (see Fig. 2). Surrounding the tray sides are outer walls 39 in spaced relation thereto and forming a reinforcing frame for the tray. These frame walls at their tops may be rounded over and inwardly, as at 40, to close the intervening spaces, and at the bottom are inturned in the form of flanges 41 which provide a base on which the tray is rested. The tray base depends below the cross walls of the cellular structure a sufficient distance to hold the latter well off of any surface on which the tray may be placed.

Each row of cells in the tray is provided with a hopper bottom capable of (1) supporting the eggs D which are placed therein; and of (2) releasing the eggs for deposit in a cellular receptacle below the tray. The hopper bottom for each cell row comprises a pair of plates 42 normally in V relation, each plate being hingedly supported on a wire 43 along its outer and upper edge. When in closed position these two plates occupy angular positions corresponding to the points 38 and may be held by tension means in contact therewith. These hopper plates, it should be noted, are parallel with the tray walls 36, and by preference are divided in the middle (see Fig. 11) where a portion of the hinge wires 43 are bared for engagement with the central wall 37 which thus provides a support for each hopper plate intermediately of its ends, the latter being supported by the tray sides 35 as shown in Fig. 8. Each hopper plate is fastened tight to its hinge wire the ends of which are offset to provide cranks 44 and 45 which alternate in character. These cranks are disposed in the protected space between the inner and outer tray sides 35 and 39. By reference to Figs. 11 and 12, it will be noted that the crank 44 is in effect a bell crank since it includes also a second crank arm 46 having a yoke which engages the other crank 45 on the proximate hopper plate. The effect of this construction is to impart a simultaneous opposite movement to each pair of connected hoppers whenever the bell crank 44 is rocked.

The two hopper plates thus hooked together for conjoint operation are disposed along the bottoms of adjacent cell rows. In order to hook up all the hopper plates for simultaneous operation, I provide a pair of bars 47, one along each end of the hopper plates and each mounted for movement endwise of itself in the space between the double walls surrounding the tray. Depending from each bar is a series of slotted lugs 48 wherein are engaged the outturned ends of the cranks 44, so that all of these cranks are hooked together for conjoint operation by means of this common connection. A pair of springs 49 connect the tray frame to the two bars in such a manner as to exert a force which tends to shift the latter endwise in a direction which holds the hopper bottoms closed so as to prevent the discharge therethrough of the eggs contained within the several cells of the tray. This position of the parts appears clearly in Figs. 2 and 9. One end 50 of each bar may be extended through the tray walls to be disposed adjacent a trigger 51 having a pivotal mounting at 52 upon the tray exterior. The lower end 53 of each trigger may depend below the tray to coact with a roller 54, the mounting of which will be explained presently. To manually operate the tray bottoms, should this be desired, I have provided for each bar a finger piece in the form of a lever 55 having a pivotal mounting between the double walls of the tray, the lower lever end carrying a pin which is engaged within a slotted lug 56 upstanding from the bar. The open position of the hopper plates is shown in Fig. 10.

A tray constructed in accordance with the preceding description is adapted for advantageous use with the conveyor mechanism hereinbefore set out. The conveyor unit A may be in the form of a belt, links, or other approved construction, and is provided with a series of mountings (not shown) for receiving the trays. Below each tray is an open space through the conveyor so that the tray, when positioned over the conveyor unit B, may discharge its contents into any receptacle which is positioned at that point. I prefer that each such receptacle should be in the form of a carton E wherein the eggs are to be placed ready for sale to the consumer. Upon the conveyor unit B are accordingly arranged in appropriate mountings 57 a series of cartons adapted by proper timing of the conveyor mechanism to be brought successively into receiving position below the trays at the moment the latter are ready to discharge their contents. This discharge operation is effected automatically and at a predetermined position when the triggers 51 engage with the roller 54 which is mounted adjacent the conveyor B (see Fig. 1). A tray having a capacity of three dozen eggs, as suggested herein, will thereupon transfer its entire load in one operation, and the eggs so released by gravity may be received into three adjacent cartons, each 2 x 6, having a capacity of one dozen each. The mountings for cartons on the conveyor unit B may be in the form of holders of the kind disclosed in Letters Patent No. 1,659,076 granted to me on February 14, 1928.

The handling of the eggs or other commodities according to this invention is both simple and expeditious. After being candled or otherwise treated, the eggs are placed in trays which are placed on the conveyor unit A to be removed mechanically to a distant point where the cartoning operation may advantageously be performed. As fast as egg-filled trays arrive, open cartons are brought to receiving position, and the transfer from one to the other is accomplished automatically and almost instantaneously. The spacing of the trays and cartons on their respective conveyor units is in such relation to their movement speeds as to insure a perfect register of one to the other with the advance of each egg-filled tray and egg-receiving carton to the transfer point, and this register may be attained irrespective of the relative travel speed of the conveyor units and of the character of their movements. Attendants, few in number, may be on hand to remove the filled cartons from the conveyor unit B and to place other empty cartons thereon. The trays may be secured fast to the conveyor unit A, or be removable therefrom—this is an optional matter. These trays may also be used to advantage where the transfer of the eggs from the treating room to the cartoning point is performed otherwise than by a conveyor mechanism, the discharge of the eggs into cartons being accomplished by manipulation of the finger pieces 55 in the manner already explained.

I claim:

1. In an egg handling apparatus, comprising a cellular tray adapted to fill a cellular carton, means for mechanically conveying the tray and carton from remote points to positions in which the tray is directly over the carton, and means for automatically opening the tray bottom for releasing eggs therefrom into the carton cells.

2. In an egg handling apparatus, comprising a tray adapted to fill a carton, means for mechanically conveying the tray into a position adjacent the carton, means for transferring eggs from the tray into the carton, and means for synchronizing the operation of the conveying and transferring means.

3. In an egg handling apparatus, the combination of two conveyor units juxtaposed at one point and adapted to move objects from remote places into adjacent relation, a plurality of evenly spaced trays carried by one unit, the other unit being adapted to carry a plurality of evenly spaced cartons, means for synchronizing the movements of the two units in a manner which ensures concurrence of each tray with a carton at the point of juxtaposition, and means for automatically transferring eggs from each tray to a carton when so juxtaposed.

4. In an egg handling apparatus, the combination of a conveyor mechanism having two synchronously driven units adapted to move distant objects into juxtaposition, trays on one unit, the other unit being adapted to carry cartons so placed as to arrive together in succession at the point of juxtaposition, and means set in operation by movement of the conveyor mechanism for automatically transferring eggs from the trays into the cartons.

5. In an egg handling apparatus, the combination of a conveyor mechanism having two synchronously driven units adapted to move distant objects into superposition, trays on one unit, the other unit being adapted to carry cartons so placed thereon as to arrive together in succession, the trays above the cartons, and means set in operation by movement of the conveyor mechanism and synchronized therewith for permitting successive gravity transfers of eggs from the trays into the cartons.

6. In an egg handling apparatus, the combination of a conveyor mechanism, a plurality of trays carried thereby and adapted to be moved to an egg transfer point, a carton mounting at the point of transfer, and means set in operation by movement of the conveyor mechanism and synchronized therewith for automatically transferring eggs from the successive trays into cartons placed upon the mounting.

7. In an egg handling apparatus, the combination of a conveyor mechanism having two synchronously driven units adapted to move distant objects into superposition, mountings on the upper unit each having an opening therethrough permitting a gravity transfer of eggs from the one to the other, egg trays carried at the mountings having normally closed discharge openings in their bottoms, mountings on the lower unit for cartons adapted successively when positioned beneath the trays to receive eggs therefrom, and means synchronized with the conveyor mechanism for releasing eggs successively from the trays through the discharge openings thereof into the cartons therebelow.

8. In an egg handling apparatus, the combination of a conveyor mechanism, mountings thereon each having an opening therethrough permitting a gravity transfer of eggs to a point below, a carton mounting at such lower point, trays carried at the first-named mountings having normally closed discharge openings in their bottoms, and means set in operation by movement of the conveyor mechanism and synchronized therewith for releasing successively eggs from the trays through the discharge openings into a carton set on the mounting therebelow.

9. In an egg handling apparatus, the combination of a tray having means for releasing eggs therefrom, a trigger device for operating said release means, a conveyor whereon the tray is movable to a discharge point, means for positioning a carton at the discharge point, and a trip engageable with the trigger device when the tray has advanced to the discharge point adapted to effect a transfer of eggs from the tray into the carton.

10. In an egg handling apparatus, the combination of a plurality of trays each having means for releasing eggs therefrom, a trigger device for operating each said release means, a conveyor unit whereon the trays are movable successively to a discharge point, a second conveyor unit whereon a plurality of cartons are advanceable in succession to a position adjacent the discharge point, a synchronized drive connecting the two conveyor units in a manner whereby a tray and carton are brought together at the discharge point, and a trip engageable with the trigger device of each tray when the latter has advanced to the discharge point adapted to effect a transfer of eggs from the tray into the carton.

11. An egg handling tray in which is combined a double-walled frame in which is supported a plurality of cross walls forming cells each adapted to receive an egg, a plurality of series of hinged plates adapted to center the eggs within the cells, each series normally angularly disposed with respect to an adjacent series and extending across the tray bottom providing a releasable support for the eggs within the cells, and means between the frame walls interconnecting the plates for conjoint release operation.

12. An egg handling tray of rigid construction having an open bottom across which is extended a plurality of series of hinged plates adapted to center the eggs within the cells, each series normally angularly disposed with respect to an adjacent series and adapted to swing into or out of vertical positions, and cross walls within the tray forming egg receiving cells therein, the plates when swung vertically permitting a gravity release of eggs from the cells and when swung to positions other than vertical affording a support for the eggs therewithin.

13. An egg handling tray of rigid construction having an open bottom across which is extended a plurality of series of hinged plates adapted to center the eggs within the cells, each series normally angularly disposed with respect to an adjacent series and adapted to swing into or out of vertical positions, cross walls within the tray forming egg receiving cells therein, the plates when swung vertically permitting a gravity release of eggs from the cells and when swung to positions other than vertical affording a support for the eggs therewithin, and means interconnecting the plates for conjoint operation.

14. An egg handling tray having an open bottom across which is extended a plurality of series of hinged plates adapted to center the eggs within the cells, each series normally angularly disposed with respect to an adjacent series and adapted to swing into or out of vertical positions, cross walls within the tray forming egg receiving cells therein, the plates when swung vertically permitting a gravity release of eggs from the cells and when swung to positions other than vertical affording a support for the eggs therewithin, means interconnecting the plates for conjoint operation, and a spring acting on said operating means adapted to maintain the plates yieldingly in one position.

15. An egg handling tray having an open bottom across which is extended a plurality of series of hinged plates adapted to center the eggs within the cells, each series normally angularly disposed with respect to an adjacent series and adapted to swing into or out of vertical positions, cross walls within the tray forming egg receiving cells therein, the plates when swung vertically permitting a gravity release of eggs from the cells and when swung to positions other than vertical affording a support for the eggs therewithin, means interconnecting the plates for conjoint operation, and a spring acting on said operating means adapted to maintain the plates yieldingly in a supporting position.

16. An egg handling tray having an open bottom across which is extended a plurality of series of hinged plates adapted to center the eggs within the cells, each series normally angularly disposed with respect to an adjacent series and adapted to swing into or out of vertical positions, cross walls within the tray forming egg receiving cells therein, the plates when swung vertically permitting a gravity release of eggs from the cells and when swung to positions other than vertical affording a support for the eggs therewithin, means interconnecting the plates for conjoint operation, a spring acting on said operating means adapted to maintain the plates yieldingly in a supporting position, and a connection extending from the operating means to a point exteriorly of the tray and adapted, upon actuation, to operate the operating means.

17. An egg handling tray having side walls between which are supported a plurality of cross walls forming egg receiving cells and a plurality of rotatably mounted wires in parallelism with each other and with the cross walls extending one way only, the wires being grouped in pairs which are disposed one adjacent the lower edge of each said cross wall and having their ends offset to provide cranks, means extended radially from the wires adapted to be swung thereby into and out of vertical position in the former of which eggs are released for discharge through the cell bottoms, and means interconnecting the wire cranks and movable to swing the alternate wires in opposite directions whereby to bar or permit a simultaneous release of eggs from the cells.

18. An egg handling tray having sides between which are supported two sets of walls in intersecting relation, a plurality of oscillatable means also extended between the tray sides, two adjacent the lower edge of each wall in one set, a crank connected with each of said oscillatable means and those in alternate order being connected with the next adjacent crank in a manner to oscillate the same in a reverse direction, and means interconnecting every other crank for conjointly operating all the oscillating means.

19. An egg handling tray having sides between which are extended two sets of walls in intersecting relation whereby to form a plurality of egg receiving cells, oscillatable means extended between the tray sides and arranged in pairs which are disposed adjacent the lower edges of one set of walls, the said means being adapted to swing into or out of vertical position to release or bar release of eggs through the cell bottoms, each pair of oscillatable means adapted to swing the same in opposite directions, and means interconnecting all of said connections for operating the oscillatable means conjointly.

20. An egg handling tray having sides supporting two sets of walls in intersecting relation whereby to form a plurality of egg receiving cells, a plurality of oscillatable means carried by the tray arranged in parallelism adjacent the lower edges of one set of walls and adapted to swing into or out of vertical position to release or bar release of eggs through the cell bottoms, and means interconnecting said oscillatable means for conjoint operation.

21. A portable handling and discharging tray having a plurality of intersecting walls forming egg receiving cells, egg centering means constituting the bottom of the tray for supporting and maintaining the eggs spaced from the walls of the cells, said means mounted for actuation to a vertical position to quickly discharge the eggs from the cells and at the same time centrally guide them therefrom.

22. A portable egg handling and discharging tray having a plurality of intersecting walls forming egg receiving cells, means normally angularly hinged to adjacent walls and constituting the bottom of the tray for supporting and maintaining the eggs centrally within the cells, said means operable to quickly discharge and to simultaneously centrally guide the eggs from the cells.

23. A portable egg handling and discharging tray having a plurality of intersecting walls forming egg receiving cells, plates normally angularly hinged to adjacent walls and constituting a bottom for the cells to centrally hold the eggs within the cells, said plates mounted for actuation about their hinges to quickly discharge and at the same time centrally guide the eggs from the cells, and means carried by the tray to actuate adjacent opposed plates simultaneously in opposite directions.

24. An egg handling tray having a plurality of intersecting walls forming egg receiving cells, the lower portion of certain of said walls being characterized by a plurality of oppositely inclined downwardly extending portions, each of said oppositely inclined portions meeting at a point located intermediate adjacent opposed intersecting walls, hingedly mounted plates normally contacting the oppositely inclined portions of said downwardly extending walls and constituting a bottom for the cells to centrally hold the eggs within the cells, said plates being operable to quickly discharge and at the same time centrally guide the eggs from the cells.

25. An egg handling tray having a plurality of intersecting walls forming egg receiving cells, the lower portion of certain of said walls being characterized by a plurality of oppositely inclined downwardly extending portions, each of said oppositely inclined portions meeting at a point located intermediate adjacent opposed intersecting walls, hingedly mounted plates normally contacting the oppositely inclined portions of said downwardly extending walls and constituting a bottom for the cells to centrally hold the eggs within the cells, said plates being operable to quickly discharge and at the same time contact the eggs to centrally guide them from the cells.

In testimony whereof I have hereunto set my hand and affixed my seal this 27th day of June, 1928.

LEON BENOIT.